United States Patent
Cheng et al.

(10) Patent No.: US 12,380,121 B2
(45) Date of Patent: Aug. 5, 2025

(54) ANOMALY DETECTION WITH LOCAL OUTLIER FACTOR

(71) Applicant: Google LLC, Mountain View, CA (US)

(72) Inventors: Xi Cheng, Kirkland, WA (US);
Zichuan Ye, Mountain View, CA (US);
Peng Lin, Mountain View, CA (US);
Jiashang Liu, Kirkland, WA (US);
Amir Hormati, Mountain View, CA (US); Mingge Deng, Kirkland, WA (US)

(73) Assignee: Google LLC, Mountain View, CA (US)

( * ) Notice: Subject to any disclaimer, the term of this patent is extended or adjusted under 35 U.S.C. 154(b) by 156 days.

(21) Appl. No.: 18/053,738

(22) Filed: Nov. 8, 2022

(65) Prior Publication Data

US 2023/0153311 A1    May 18, 2023

Related U.S. Application Data

(60) Provisional application No. 63/263,983, filed on Nov. 12, 2021.

(51) Int. Cl.
*G06F 16/24* (2019.01)
*G06F 16/215* (2019.01)
(Continued)

(52) U.S. Cl.
CPC ........ *G06F 16/2462* (2019.01); *G06F 16/215* (2019.01); *G06F 16/256* (2019.01)

(58) Field of Classification Search
CPC .. G06F 16/2462; G06F 16/215; G06F 16/256; H04L 63/1425
(Continued)

(56) References Cited

U.S. PATENT DOCUMENTS 10,045,218 B1 *  8/2018  Stapleton ................. G06N 5/01
10,193,912 B2 *  1/2019  Mermoud ........... H04L 63/1416
(Continued)

FOREIGN PATENT DOCUMENTS

CN      111401460 A    7/2020

OTHER PUBLICATIONS

International Search Report and Written Opinion for the related Application No. PCT/US2022/079508, dated Jan. 25, 2023, 89 pages.
(Continued)

*Primary Examiner* — Hanh B Thai
(74) *Attorney, Agent, or Firm* — Shumaker & Sieffert, P.A.

(57) ABSTRACT

A method for anomaly detection includes receiving an anomaly detection query from a user. The anomaly detection query requests data processing hardware determine one or more anomalies in a dataset including a plurality of examples. Each example in the plurality of examples is associated with one or more features. The method includes training a model using the dataset. The trained model is configured to use a local outlier factor (LOF) algorithm. For each respective example of the plurality of examples in the dataset, the method includes determining, using the trained model, a respective local deviation score based on the one or more features. The method includes determining that the respective local deviation score satisfies a deviation score threshold and, based on the location deviation score satisfying the threshold, determining that the respective example is anomalous. The method includes reporting the respective anomalous example to the user.

18 Claims, 8 Drawing Sheets

(51) Int. Cl.
  *G06F 16/2458* (2019.01)
  *G06F 16/25* (2019.01)
(58) Field of Classification Search
  USPC .......................................................... 707/688
  See application file for complete search history.

(56) References Cited

U.S. PATENT DOCUMENTS

| | | | | |
|---|---|---|---|---|
| 11,553,005 | B1* | 1/2023 | Narigapalli | H04L 63/101 |
| 11,580,081 | B1* | 2/2023 | Rodgers | G06N 3/02 |
| 11,663,256 | B2* | 5/2023 | Sastry | G06N 20/00 |
| | | | | 707/723 |
| 2007/0217676 | A1* | 9/2007 | Grauman | G06V 10/764 |
| | | | | 382/190 |
| 2012/0137367 | A1* | 5/2012 | Dupont | G06F 21/00 |
| | | | | 726/25 |
| 2013/0297590 | A1* | 11/2013 | Zukovsky | G06F 16/951 |
| | | | | 707/722 |
| 2018/0316707 | A1* | 11/2018 | Dodson | H04L 43/20 |
| 2019/0102553 | A1* | 4/2019 | Herwadkar | G06N 20/00 |
| 2019/0164287 | A1* | 5/2019 | Gregson | G16H 30/40 |
| 2019/0188065 | A1* | 6/2019 | Anghel | G06F 11/0778 |
| 2019/0188212 | A1 | 6/2019 | Miller et al. | |
| 2020/0053108 | A1 | 2/2020 | Cili et al. | |
| 2020/0265045 | A1* | 8/2020 | Tepper | G06F 16/2462 |
| 2020/0285737 | A1* | 9/2020 | Kraus | G06F 21/552 |
| 2020/0382536 | A1 | 12/2020 | Dherange et al. | |
| 2021/0224267 | A1* | 7/2021 | Dongaonkar | G06F 16/221 |
| 2022/0329613 | A1 | 10/2022 | Abbaszadeh et al. | |
| 2022/0398272 | A1* | 12/2022 | Sastry | G06F 16/86 |
| 2022/0407889 | A1* | 12/2022 | Narigapalli | H04L 63/101 |
| 2023/0121812 | A1* | 4/2023 | Yin | G06V 10/774 |
| | | | | 706/15 |

OTHER PUBLICATIONS

Minh Quoc Nguyen et al: "A Fast Randomized Method for Local Density-Based Outlier Detection in High Dimensional Data", Aug. 30, 2010 (Aug. 30, 2010), SAT 2015 18TB International Conference, Austin, TX, USA, Sep. 24-27, 2015; [Lecture Notes in Computer Science; Lect.Notes Computer], Springer, Berlin, Heidelberg, pp. 215-226, XP019148647, ISBN: 978-3-540-74549-5 abstract, 12 pages.

Xu Zekun et al: "Automatic Hyperparameter Tuning Method for Local Outlier Factor, with Applications to Anomaly Detection", 2019 IEEE International Conference on Big Data (Big Data), IEEE, Dec. 9, 2019 (Dec. 9, 2019), pp. 4201-4207, XP033721319, DOI: 10.1109/BIGDATA47090. 2019.9006151 [retrieved on Feb. 20, 2020] paragraph [00II], 7 pages.

Response to Communication Pursuant to Rules 161(1) and 162 EPC dated Jun. 19, 2024, from counterpart European Application No. 22821817.8, filed Dec. 17, 2024, 47 pp.

* cited by examiner

ANOMALY DETECTION WITH LOCAL OUTLIER FACTOR

CROSS REFERENCE TO RELATED APPLICATIONS

This U.S. patent application claims priority under 35 U.S.C. § 119(e) to U.S. Provisional Application 63/263,983, filed on Nov. 12, 2021. The disclosure of this prior application is considered part of the disclosure of this application and is hereby incorporated by reference in its entirety.

TECHNICAL FIELD

This disclosure relates to machine learning using Local Outlier Factor (LOF) for anomaly detection.

BACKGROUND

Anomaly detection is commonly defined as a process of identifying unexpected items or events in datasets that differ from the norm. Anomaly detection is an important problem that has been studied within diverse research areas and has broad application domains. Moreover, anomaly detection is an increasingly desirable product that offers many real world applications such as fraud detection, time-series, event detection, and cyber-attack detection. Anomalies and their corresponding solutions are usually categorized by the desired application scenarios. The simplest and most widely used scenarios are point anomalies, which are individual data points identified as anomalies with respect to the rest of the data.

SUMMARY

One aspect of the disclosure provides a computer-implemented method for anomaly detection that when executed by data processing hardware causes the data processing hardware to perform operations. The operations include receiving an anomaly detection query from a user. The anomaly detection query requests the data processing hardware determine one or more anomalies in a dataset including a plurality of examples. Each example in the plurality of examples is associated with one or more features. The operations include training a model using the dataset. The trained model is configured to use a local outlier factor (LOF) algorithm. For each respective example of the plurality of examples in the dataset, the operations include determining, using the trained model, a respective local deviation score based on the one or more features. The operations include determining that the respective local deviation score satisfies a deviation score threshold and, based on the location deviation score satisfying the threshold, determining that the respective example is anomalous. The operations also include reporting the respective anomalous example to the user.

Implementations of the disclosure may include one or more of the following optional features. In some implementations, the trained model uses locality sensitive hashing to determine pairwise distance computations between pairs of respective examples of the plurality of examples. In some of these implementations, the trained model uses randomized LOF based on random projection to generate a random vector based on the dataset. When a size of the dataset satisfies a size threshold, the trained model may use randomized LOF and when the size of the dataset fails to satisfy the size threshold, the trained model may use standard LOF. In other of these implementations, the pairwise distance computations determined by the locality sensitive hashing include cosine distances. In yet other of these implementations, the pairwise distance computations determined by the locality sensitive hashing include Euclidean distances. Determining, using the trained model, the respective local deviation score may include determining, using the trained model, a number of nearest neighbors to the respective example and determining, using the trained model, a local reachable density of the respective example.

In some examples, the anomaly detection query includes a single Structured Query Language (SQL) query. The data processing hardware optionally resides on a cloud database system. The operations may further include removing duplicate examples from the plurality of examples.

Another aspect of the disclosure provides a system for anomaly detection. The system includes data processing hardware and memory hardware in communication with the data processing hardware. The memory hardware stores instructions that when executed on the data processing hardware cause the data processing hardware to perform operations. The operations include receiving an anomaly detection query from a user. The anomaly detection query requests the data processing hardware determine one or more anomalies in a dataset including a plurality of examples. Each example in the plurality of examples is associated with one or more features. The operations include training a model using the dataset. The trained model is configured to use a local outlier factor (LOF) algorithm. For each respective example of the plurality of examples in the dataset, the operations include determining, using the trained model, a respective local deviation score based on the one or more features. The operations include determining that the respective local deviation score satisfies a deviation score threshold and, based on the location deviation score satisfying the threshold, determining that the respective example is anomalous. The operations also include reporting the respective anomalous example to the user.

This aspect may include one or more of the following optional features. In some implementations, the trained model uses locality sensitive hashing to determine pairwise distance computations between pairs of respective examples of the plurality of examples. In some of these implementations, the trained model uses randomized LOF based on random projection to generate a random vector based on the dataset. When a size of the dataset satisfies a size threshold, the trained model may use randomized LOF and when the size of the dataset fails to satisfy the size threshold, the trained model may use standard LOF. In other of these implementations, the pairwise distance computations determined by the locality sensitive hashing include cosine distances. In yet other of these implementations, the pairwise distance computations determined by the locality sensitive hashing include Euclidean distances. Determining, using the trained model, the respective local deviation score may include determining, using the trained model, a number of nearest neighbors to the respective example and determining, using the trained model, a local reachable density of the respective example.

In some examples, the anomaly detection query includes a single Structured Query Language (SQL) query. The data processing hardware optionally resides on a cloud database system. The operations may further include removing duplicate examples from the plurality of examples.

The details of one or more implementations of the disclosure are set forth in the accompanying drawings and the

DESCRIPTION OF DRAWINGS

Like reference symbols in the various drawings indicate like elements.

DETAILED DESCRIPTION

Anomaly detection refers to the problem of finding patterns in data that do not conform to expected behavior (i.e., outlier detection). Anomaly detection is an important problem that has been studied within diverse research areas and has broad application domains. Moreover, anomaly detection is an increasingly desirable product that offers many real world applications such as fraud detection, time-series, event detection, and cyber-attack detection. Anomalies and their corresponding solutions are usually categorized by the desired application scenarios. The simplest and most widely used scenarios are point anomalies, which are individual data points identified as anomalies with respect to the rest of the data.

Local Outlier Factor (LOF) is a density-based anomaly detection algorithm. Compared to distance-based approaches (e.g., k-means), density-based approaches preserve locality while still capturing outliers effectively. This is predicated on the fact that outliers have significant lower density compared with inliers in their neighborhood. While LOF is often studied in literature, conventional techniques do not support large datasets, making them unsuitable for cloud-based implementations that must support extremely large datasets.

Implementations herein provide systems and methods for detecting anomalies in data using LOF in, for example, a cloud database system. The system can handle both millions of rows and millions of features (i.e., columns). To provide such scalability, the system may include a Structured Query Language (SQL) based implementation of LOF within a cloud database system. The system may provide multiple algorithms, such as standard LOF and randomized LOF, to provide tradeoffs between scalability and accuracy. In some implementations, the system automatically toggles between the different algorithms based on one or more properties of the input data. Optionally, the system implements locality-sensitive hashing (LSH) with LOF to further improve scalability. The system may offer both Euclidean and cosine distance options with either standard LOF or randomized LOF. The system is a fully managed service that is orchestrated without attention required from users.

Figure 1:
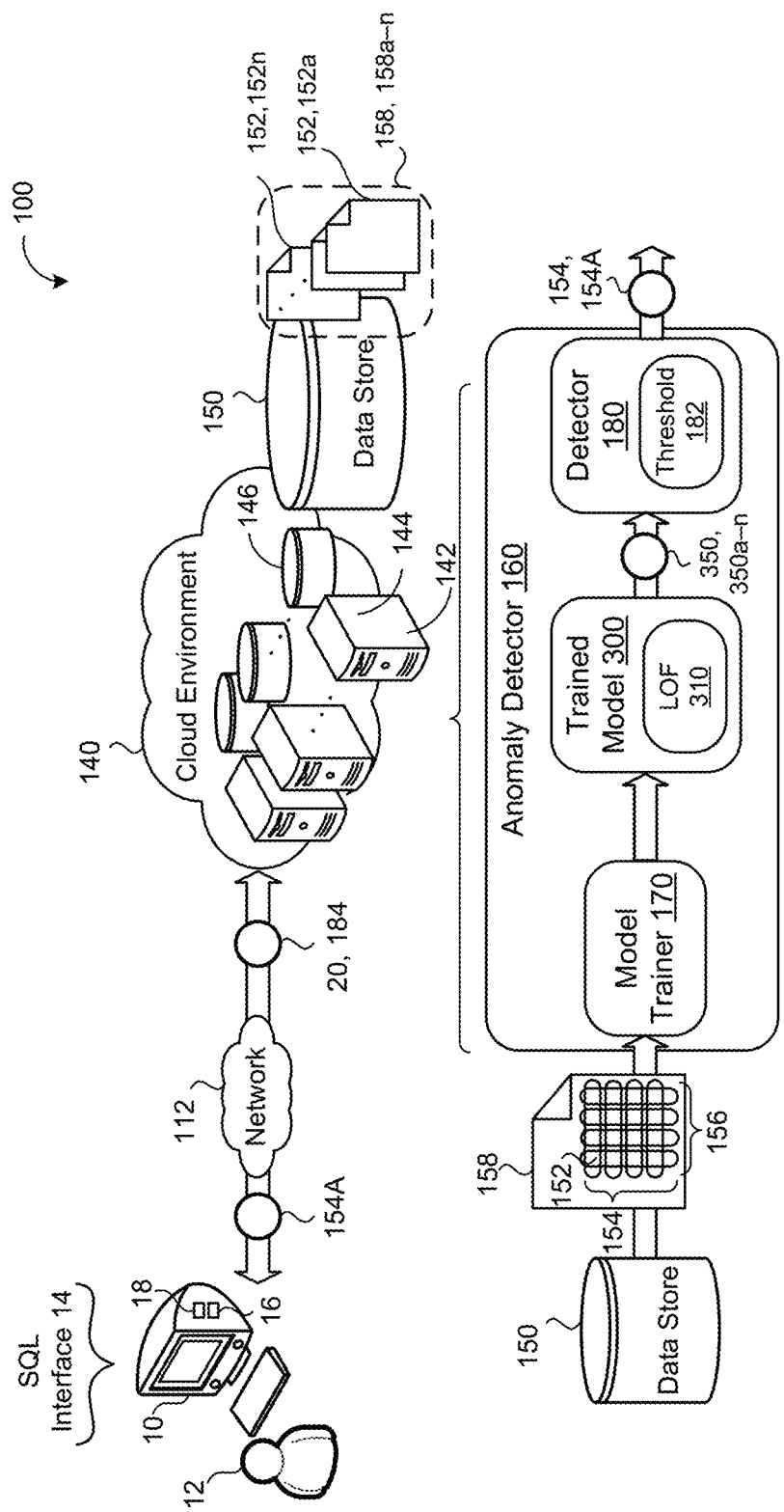
FIG. 1 is a schematic view of an example system for anomaly detection using local outlier factor.

Referring now to FIG. 1, in some implementations, an example anomaly detection system 100 includes a remote system 140 in communication with one or more user devices 10 via a network 112. The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware). A data store 150 (i.e., a remote storage device) may be overlain on the storage resources 146 to allow scalable use of the storage resources 146 by one or more of the clients (e.g., the user device 10) or the computing resources 144. The data store 150 is configured to store a plurality of data blocks 152, 152a—n within one or more tables 158, 158a—n (i.e., a cloud database or dataset). The data store 150 may store any number of tables 158 at any point in time.

The remote system 140 is configured to receive an anomaly detection query 20 from a user device 10 associated with a respective user 12 via, for example, the network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware). The user 12 may construct the query 20 using a Structured Query Language (SQL) interface 14.

The remote system 140 executes an anomaly detector 160. The anomaly detector 160 receives the anomaly detection query 20. The anomaly detection query 20 requests the anomaly detector 160 to query a dataset 158 specified by the query 20 and stored in the data store 150. The dataset 158 includes a plurality of examples 154 (e.g., rows), with each example 154 associated with one or more features 156 (e.g., columns). The examples 154 may be referred to interchangeably as data points 154. The anomaly detector 160 may include a model trainer 170. The model trainer 170 trains a model 300 using the dataset 158. That is, the model trainer 170 trains the model 300 using the same data the anomaly detection query 20 requests the anomaly detector 162 to detect anomalies within. The trained model 300 includes an LOF algorithm 310.

Figure 2A:
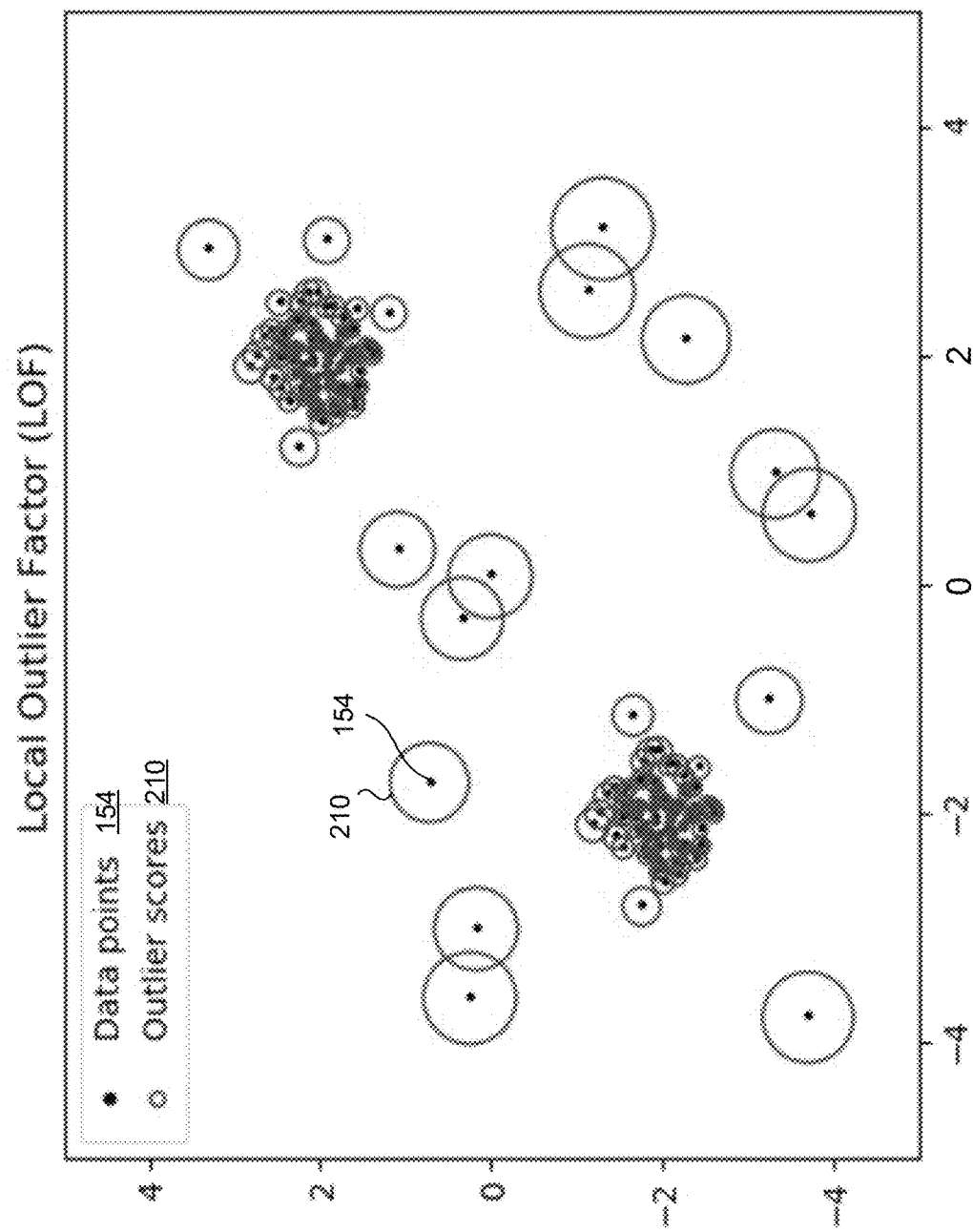
FIGS. 2A and 2B are schematic views of anomaly detection using local outlier factor.
Figure 2B:
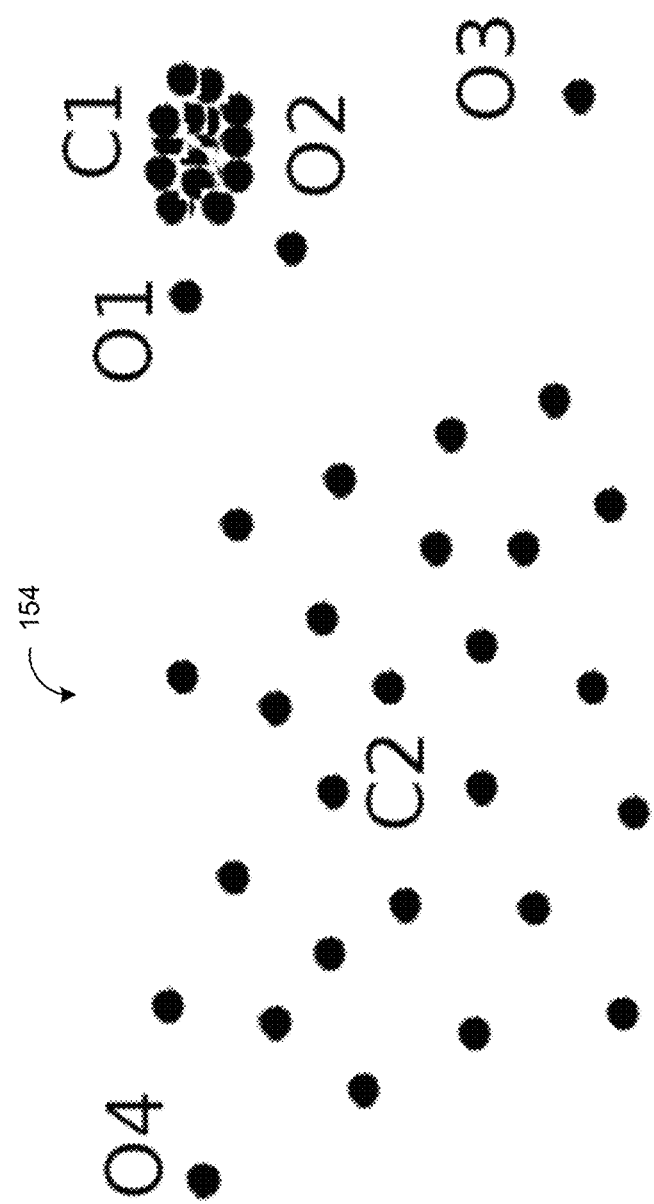

Referring now to FIGS. 2A and 2B, given a training example x (i.e., a respective training example 154), the use of LOF computes a positive score lof(x) that is an indicator of how significant x is an outlier. As illustrated in schematic view 200A of FIG. 2A, inlier examples x have lof(x) scores 210 that are approximately equal to one. In this example, the respective features 156 (FIG. 1) of the examples 154 determine their location and/or orientation with respect to each of the other examples 154. Here, for simplicity, the examples 154 are plotted in two dimensions, however, in practice, the examples 154 may include any number of dimensions (i.e., features 156). In this example, the radius of the circle surrounding the data point is a visual representation of the lof(x) score 210. That is, a larger radius circle indicates a larger score and a more significant outlier. When lof(x) is much larger than one, the respective example x may be identified as an outlier. A predetermined or user-defined threshold for lof(x) scores may be used to differentiate outliers and inliers. That is, when the threshold is satisfied (e.g., the outlier score is greater than the threshold), the anomaly detector 160 determines that the respective example 154 is an anomaly. As shown in the schematic view 200A, the data points 154 grouped closer together have lower outlier scores 210 (i.e., the data points 154 are inliers)

while the data points 154 that do not have many close neighbors have larger outlier scores 210 (i.e., the data points 154 are outliers).

To determine the lof(x) score (i.e., the outlier score 210), the LOF algorithm 310 may use a predetermined or user-specified parameter k to quantify a neighborhood around each example 154 (i.e., data point). For each example 154, the LOF algorithm 310 determines an average density, namely a local reachability density (LRD), and compares the LRD(x) for the example x and the average LRD for other examples 154 in the neighborhood of the respective example x. The LOF may be defined as the average ratio of the local reachability densities of each neighbor of the respective example 154 (i.e., x) to the LRD of the respective example (i.e., x). When the ratio is greater than one, the density of the respective example 154 is on average smaller than the density of its neighbors and, thus, from the respective example 154, there are greater distances to the next example 154 or cluster of examples 154 than from neighbors of the respective example 154 to their next neighbors.

Thus, the LOF of an example 154 reveals the density of the example 154 compared to the density of the example's neighbors. When the density of an example 154 is much smaller than the densities of its neighbors (e.g., LOF>>1), the example 154 is far from dense areas and, hence, likely an outlier. Schematic view 200B of FIG. 2B is a plot of several data points (e.g., examples 154) within a first cluster C1 and a second cluster C2. The local outliers O1 and O2 have a lower density within cluster C1 than their neighbors. The data point O4 is an inlier to cluster C2 and the data point O3 is a global outlier (i.e., not local to either cluster C1, C2).

Referring back to FIG. 1, in some implementations, the anomaly detector 160, determines, using the trained model 300, a respective local deviation score 350, 350*a*—n for each respective example 154 in the dataset 158 requested by the query 20 based on the one or more features 156 of the respective example 154. The examples 154 are positioned relative to each other examples based on values of the features 156 (i.e., the dimensionality of the examples 154). The local deviation score 350 is representative of the density of the example 154 compared to the density of the example's neighbors, and determined by the LOF algorithm 310. For example, the trained model 300 determines a number of nearest neighbors to the respective example 154 and determines a local reachable density of the respective example 154 using the determined number of nearest neighbors. The number of nearest neighbors may be predetermined or user configurable. The number of nearest neighbors may be determined by a default value (e.g., twenty) that the user 12 may configure (i.e., adjust larger or smaller).

A detector 180 includes a deviation score threshold 182. When the local deviation score 350 satisfies the deviation score threshold 182, the detector 180 may determine that the respective example 154, 154A is anomalous. The deviation score threshold 182 may be predetermined by the anomaly detector 160 (e.g., based on the dataset or other parameters) or configured by the user 12. The detector 180 may report each anomalous example 154A to the user 12 (e.g., via the user device 10). For example, the detector 180 reports the anomalous examples 154A to the user 12 as a response 184 to the query 20. In some examples, the detector 180 reports the local deviation score 350 for each example 154 (e.g., sorted by local deviation score 350 in a table).

In some examples, the anomaly detector 160 preprocesses the dataset 158 prior to, during, or after training the model 300. For example, the anomaly detector 160 includes configurable null imputation (i.e., examples 154 missing one or more features 156 may be replaced with null). Alternatively, examples 154 missing one or more features 156 may be removed from the dataset 158 entirely. The anomaly detector 160 may standardize numerical features 156 to make distance (e.g., cosine distance and/or Euclidean distance) meaningful. In some implementations, the anomaly detector 160 removes all duplicate examples 154. Alternatively, the anomaly detector 160 may default the local deviation score 350 to a predetermined value (e.g., one) for all duplicates.

Figure 3:
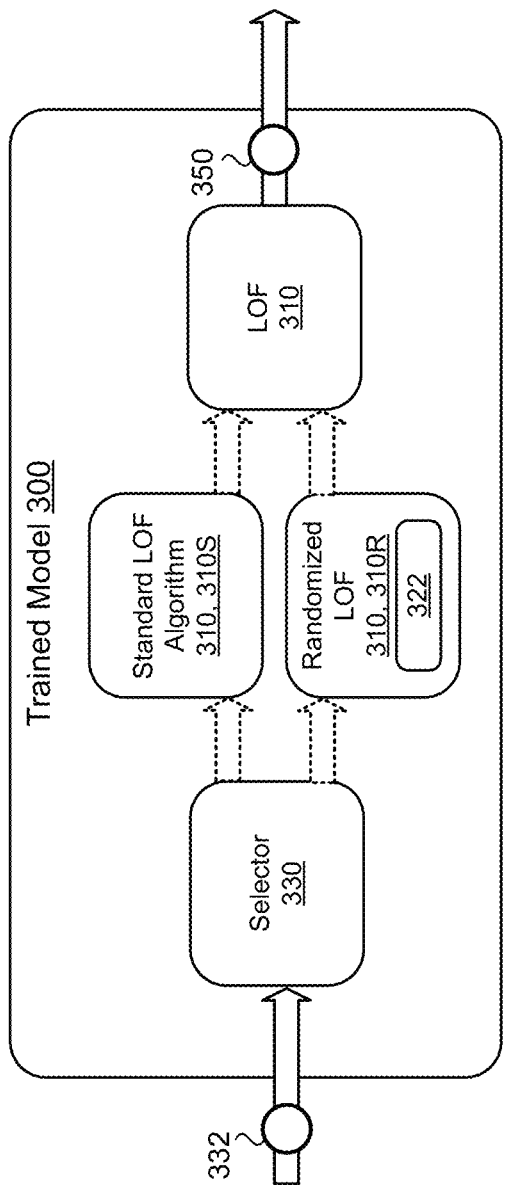
FIG. 3 is a schematic view of exemplary components of the system of FIG. 1.

Referring now to FIG. 3, the LOF algorithm 310 requires pairwise distance computation between examples 154 (i.e., between the respective example 154 and each of its k neighbors). Given m training examples, the pairwise distance computation requires $O(m^2)$ time and thus suffers scalability issues when m is large (i.e., when the dataset 158 is large, such as when the dataset 158 belongs to a cloud database). To cope with this issue, the anomaly detector 160 may partition the examples 154 such that the distance computation and neighborhood exploration is localized. To this end, in some implementations, the anomaly detector 160 and/or trained model 300 implement locality sensitive hashing (LSH).

As shown in FIG. 3, in some implementations, the trained model 300 includes a standard or brute-force LOF algorithm 320, 320S. For example, the standard LOF 310S uses a brute-force k-nearest neighbors (KNN) algorithm (i.e., an algorithm that determines the pairwise distance computation for every pair of examples 154 in the dataset 158). The brute-force KNN algorithm may be accurate, but due to determining the pairwise distance computations for every possible pair of examples 145, the algorithm is not scalable for large datasets 158. The trained model also may include a randomized LOF 310, 310R that uses a LSH algorithm 322 as discussed in more detail below. The trained model 300 uses the LSH algorithm 322 to determine pairwise distance computations between pairs of respective examples 154 in a scalable manner suitable for large datasets such as datasets 158 of a cloud database 150.

Figure 4:
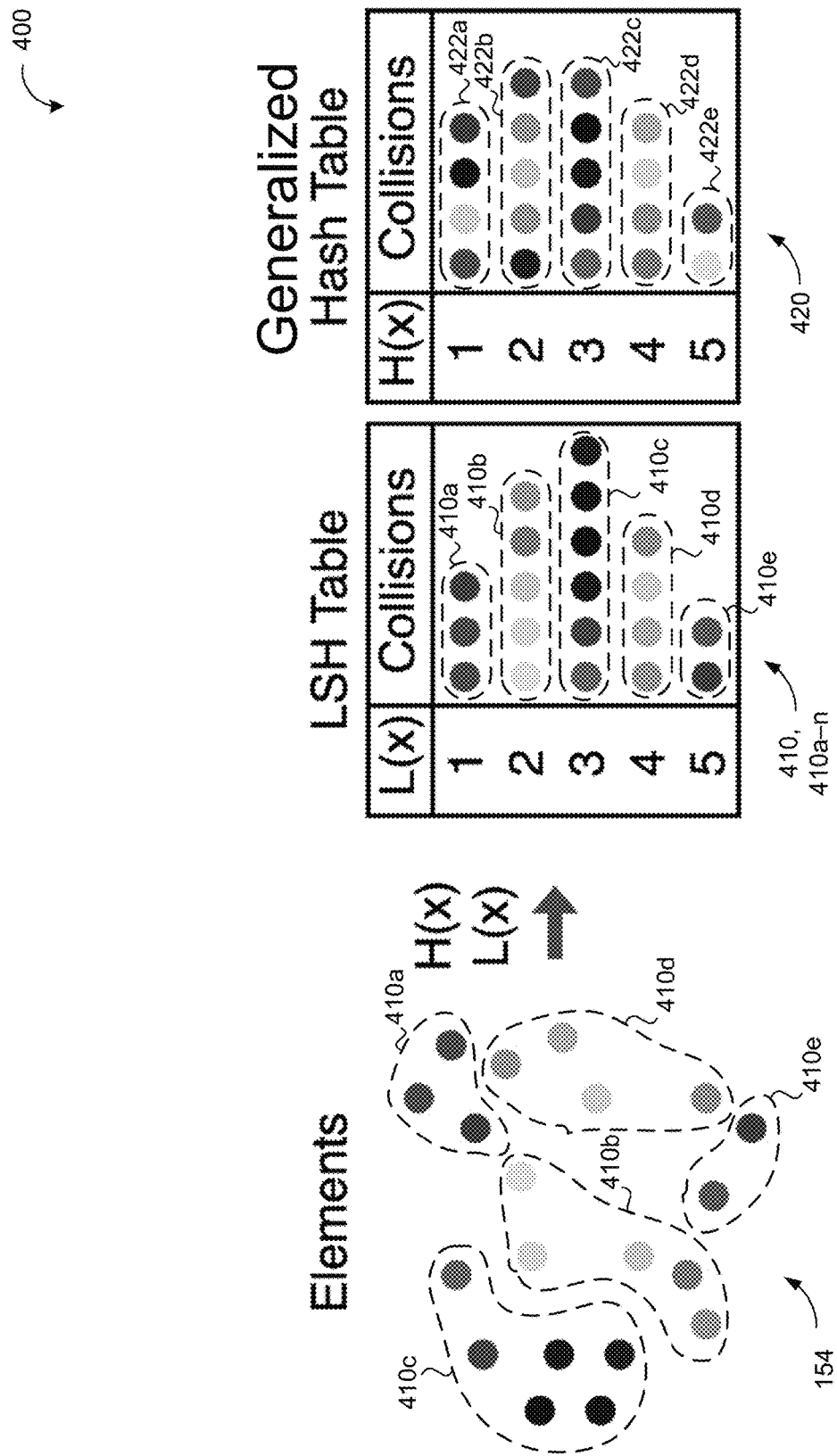
FIG. 4 is a schematic view of locality-sensitive hashing.

Referring now to FIG. 4, LSH involves quickly computing a hash code for each example 154, such that nearby neighbors of a respective example 154 are hashed into the same bucket 410, 410*a*-*n*, as shown in schematic view 400. With LSH, examples 154 near each other have a high probability of being hashed into the same bucket 410, while examples 154 far from each other have a low probability of being hashed into the same bucket 410. In this example, there are five buckets, but the LSH may hash the examples 154 into any number of buckets 410. In the given example, the data points (i.e., examples 154) are sorted into one of five buckets 410*a*-*e*. When using general hashing H(x), the collisions of data points are scattered across five buckets 422*a*-*e* without regard for the location relative to each other. That is, as shown in the generalized hash table 420, the buckets 422*a*-*e* are filled with examples 154 that are not neighbors. However, using locality sensitive hashing H(x), the collisions of data points 154 tend to be sorted into buckets 410 with other data points 154 that are close in distance.

Referring back to FIG. 3, the trained model may use the examples 154 sorted into the same bucket 410 as the nearest neighbors when determining the local deviation score 350. This reduces and simplifies the pairwise distance computations necessary. The trained model 300 may support both brute-force KNN and fast KNN. For example, the trained model 300 uses the standard LOF 310S when accuracy is of high importance and/or when the dataset 158 is small. The trained model may use randomized LOF 310R with the LSH algorithm 322 when scalability or speed is of high importance (e.g., the dataset 158 is large). The user 12 may select the LOF algorithm 310. In some implementations, a selector 330 selects the LOF algorithm 310 automatically based on, for example, parameters 332 of the dataset 158. The parameters include, in some implementations, a size of the dataset 158 (e.g., a row count and/or feature dimensionality after one-hot encoding and/or other array feature expansion). For example, when the size of the dataset 158 satisfies a size threshold, the trained model 300 uses the randomized LOF 310R and when the dataset 158 fails to satisfy the size threshold, the trained model 300 uses the standard LOF 310S.

Figure 5:
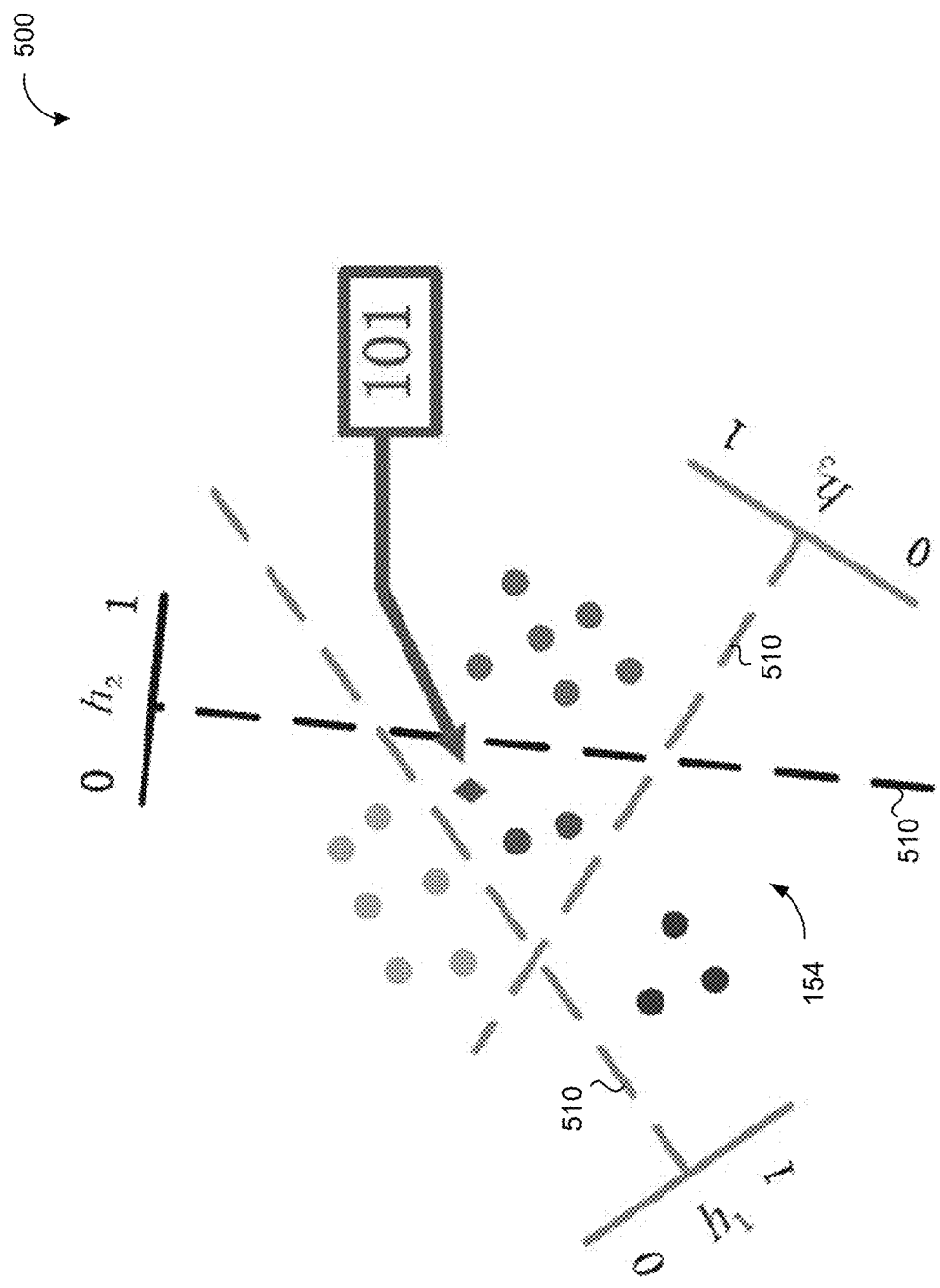
FIG. 5 is a schematic view of locality-sensitive hashing with random projection.

Referring now to FIG. 5, it is a non-deterministic polynomial-time hard (NP-hard) problem to compute an LSH family. To devise proper LSH families and hash functions, in some implementations, the system considers one or both of cosine distances and Euclidean distances. For both distances, the anomaly detector 160 may implement random projection to generate random vectors 510 (i.e., the direction of the vector 510 is determined randomly) through the data points 154. Each element of the random vector 510 may be derived from the standard Gaussian distribution N(0, 1).

The Euclidean distance may be defined as $d_{Euclidean}(x, y) = \|x-y\|$ where $\|x\|$ is the L2 norm of x. The LSH family for Euclidean distance is $$\left(\frac{1}{2}w, 2w, \frac{1}{2}, \frac{1}{3}\right)$$

for any positive w, which is namely the bucket length. Each h(x) is computed a $$h(x) = \text{round}\left(\frac{\langle x, v\rangle + b}{w}\right)$$

where w is positive (i.e., the bucket length for Euclidean distance), b is uniformly selected positive between 0 and w, and v is a randomly generated vector with the same dimension as the training examples 154, such that each element $v_i$ of v follows the standard Gaussian distribution N(0, 1).

The cosine similarity may be defined as $$\cos(x, y) = \frac{\langle x, y\rangle}{\|x\|\|y\|}$$

where <x, y> is the inner product of x and y. The cosine distance may thus be defined as $d_{cosine}(x, y) = 1 - \cos(x, y)$. The LSH family for any angular distance is $$\left(\alpha_1, \alpha_2, \frac{1-\alpha_1}{180}, \frac{1-\alpha_2}{180}\right)$$

for any angles $\alpha_1$ and $\alpha_2$ between any two vectors. Angular distance is proportional to the cosine distance and preserves a ratio of 0.878. The LSH families for cosine distance are approximately configured using the LSH families for angular distances. Based on the random vector 510, the anomaly detector 160 may generate a bit h(x) of the hash. For example, when <x, v> is greater than or equal to zero, h(x) is '1' and otherwise, h(x) is '0'. Thus, the randomized LSH algorithm 320R may be based on random projection to generate a random vector 510 based on the dataset 158 for either cosine distance or Euclidean distance.

Referring back to FIG. 3, in some implementations, the LSH algorithm 322 constructs a set of hash tables $B=[B_1, B_2, \ldots, B_L]$ where each $B_i$ in (i in [1, L]) is a hash table corresponding to the i-th band of signature. For each respective data point 154 (i.e., x), the LSH algorithm 322 invokes the hash function $h=[h_1, h_2, \ldots, h_r]$ over the respective data point 154 and generates the signature h(x). The LSH algorithm 322 adds the respective data point 154 x to the bucket 410 in each of the band hash tables $B_i$ based on the key corresponding to the i-th band. Accordingly, in the worst case, the LSH algorithm 322 takes O(mnd) time to construct the hash tables. To search nearest neighbors, the LOF 310 requires O(log(m)) time to obtain the candidate neighbors in each banding hash table. For the KNN search problem, the number of hash tables L controls the false negative rate and the number of vectors per table t controls the false positive rate. In some implementations, $$t = \log\left(\frac{m}{k}\right)/\log\left(\frac{1}{P_2}\right)$$

such that the average mistake that an answer is not a KNN is 1 for each bucket. In some examples, L is less than ten. For example, L is four.

Figure 6:
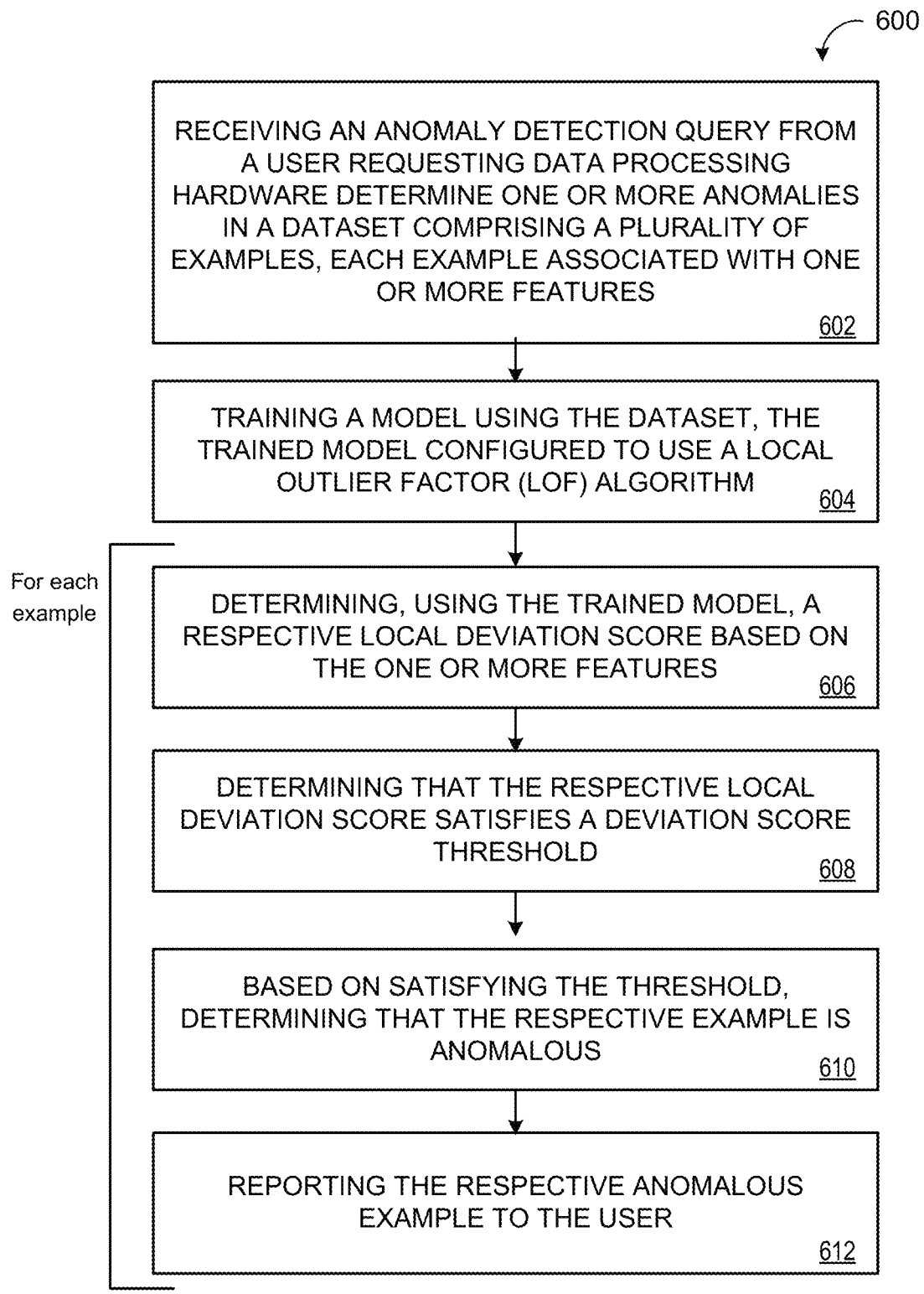
FIG. 6 is a flowchart of an example arrangement of operations for a method of detecting anomalies using local outlier factor.

FIG. 6 is a flowchart of an exemplary arrangement of operations for a method 600 of detecting anomalies using local outlier factor. The method 600, at operation 602, includes receiving an anomaly detection query 20 from a user 12. The anomaly detection query 20 requests data processing hardware 144 determine one or more anomalous examples 154A in a dataset 158 comprising a plurality of examples 154. Each example 154 in the plurality of examples 154 is associated with one or more features 156. At operation 604, the method 600 includes training a model 300 using the dataset 158. The trained model 300 is configured to use a local outlier factor (LOF) algorithm 310. For each respective example 154 of the plurality of examples 154 in the dataset 158, the method 600, at operation 606, includes determining, using the trained model 300, a respective local deviation score 350 based on the one or more features 156. At operation 608, the method 600 includes, when the respective local deviation score 350 satisfies a deviation score threshold 182, determining that the respective example 154A is anomalous. At operation 610, the method 600 includes reporting the anomalous respective example 154A to the user 12.

Figure 7:
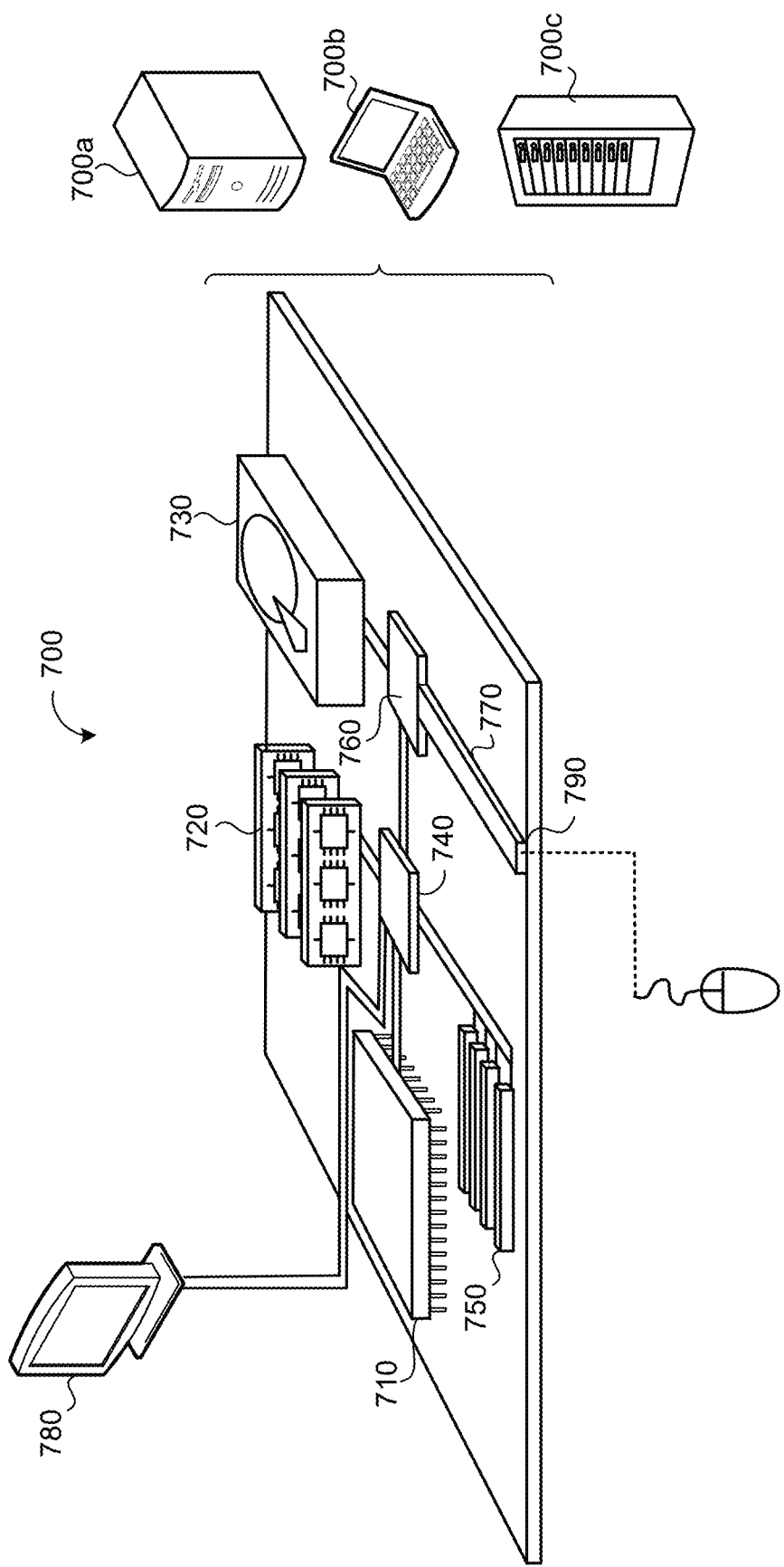
FIG. 7 is a schematic view of an example computing device that may be used to implement the systems and methods described herein.

FIG. 7 is a schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   receiving an anomaly detection query from a user, the anomaly detection query requesting the data processing hardware to determine one or more anomalies in a dataset comprising a plurality of examples, each example in the plurality of examples associated with one or more features;
   training a model using the dataset, the trained model configured to use a standard local outlier factor (LOF) algorithm and a randomized LOF algorithm, the randomized LOF algorithm having a greater scalability for large datasets relative to the standard LOF;
   determining that a size of the dataset satisfies a size threshold;
   based on determining that the size of the dataset satisfies the size threshold, selecting the randomized LOF algorithm; and
   for each respective example of the plurality of examples in the dataset:
      determining, using the trained model and the selected randomized LOF algorithm, a respective local deviation score based on the one or more features;
      determining that the respective local deviation score satisfies a deviation score threshold,
      based on the deviation score satisfying the deviation score threshold, determining that the respective example is anomalous; and
      reporting the respective anomalous example to the user.

2. The method of claim 1, wherein the trained model uses locality sensitive hashing to determine pairwise distance computations between pairs of respective examples of the plurality of examples.

3. The method of claim 2, wherein the trained model uses the randomized LOF algorithm based on random projection to generate a random vector based on the dataset.

4. The method of claim 2, wherein the pairwise distance computations determined by the locality sensitive hashing comprise cosine distances.

5. The method of claim 2, wherein the pairwise distance computations determined by the locality sensitive hashing comprise Euclidean distances.

6. The method of claim 2, wherein determining, using the trained model, the respective local deviation score comprises:
   determining, using the trained model, a number of nearest neighbors to the respective example; and
   determining, using the trained model, a local reachable density of the respective example.

7. The method of claim 1, wherein the anomaly detection query comprises a single Structured Query Language (SQL) query.

8. The method of claim 1, wherein the data processing hardware resides on a cloud database system.

9. The method of claim 1, wherein the operations further comprise removing duplicate examples from the plurality of examples.

10. A system comprising:
   data processing hardware; and
   memory hardware in communication with the data processing hardware, the memory hardware storing instructions that when executed on the data processing hardware cause the data processing hardware to perform operations comprising:
      receiving an anomaly detection query from a user, the anomaly detection query requesting the data processing hardware to determine one or more anomalies in a dataset comprising a plurality of examples, each example in the plurality of examples associated with one or more features;
      training a model using the dataset, the trained model configured to use a standard local outlier factor (LOF) algorithm and a randomized LOF algorithm, the randomized LOF algorithm having a greater scalability for large datasets relative to the standard LOF;
      determining that a size of the dataset satisfies a size threshold;
      based on determining that the size of the dataset satisfies the size threshold, selecting the randomized LOF algorithm; and
      for each respective example of the plurality of examples in the dataset:
         determining, using the trained model and the selected randomized LOF algorithm, a respective local deviation score based on the one or more features;
         determining that the respective local deviation score satisfies a deviation score threshold,
         based on the deviation score satisfying the deviation score threshold, determining that the respective example is anomalous; and
         reporting the respective anomalous example to the user.

11. The system of claim 10, wherein the trained model uses locality sensitive hashing to determine pairwise distance computations between pairs of respective examples of the plurality of examples.

12. The system of claim 11, wherein the trained model uses the randomized LOF algorithm based on random projection to generate a random vector based on the dataset.

13. The system of claim 11, wherein the pairwise distance computations determined by the locality sensitive hashing comprise cosine distances.

14. The system of claim 11, wherein the pairwise distance computations determined by the locality sensitive hashing comprise Euclidean distances.

15. The system of claim 11, wherein determining, using the trained model, the respective local deviation score comprises:
   determining, using the trained model, a number of nearest neighbors to the respective example; and
   determining, using the trained model, a local reachable density of the respective example.

16. The system of claim 10, wherein the anomaly detection query comprises a single Structured Query Language (SQL) query.

17. The system of claim 10, wherein the data processing hardware resides on a cloud database system.

18. The system of claim 10, wherein the operations further comprise removing duplicate examples from the plurality of examples.

* * * * *